Figure 1:
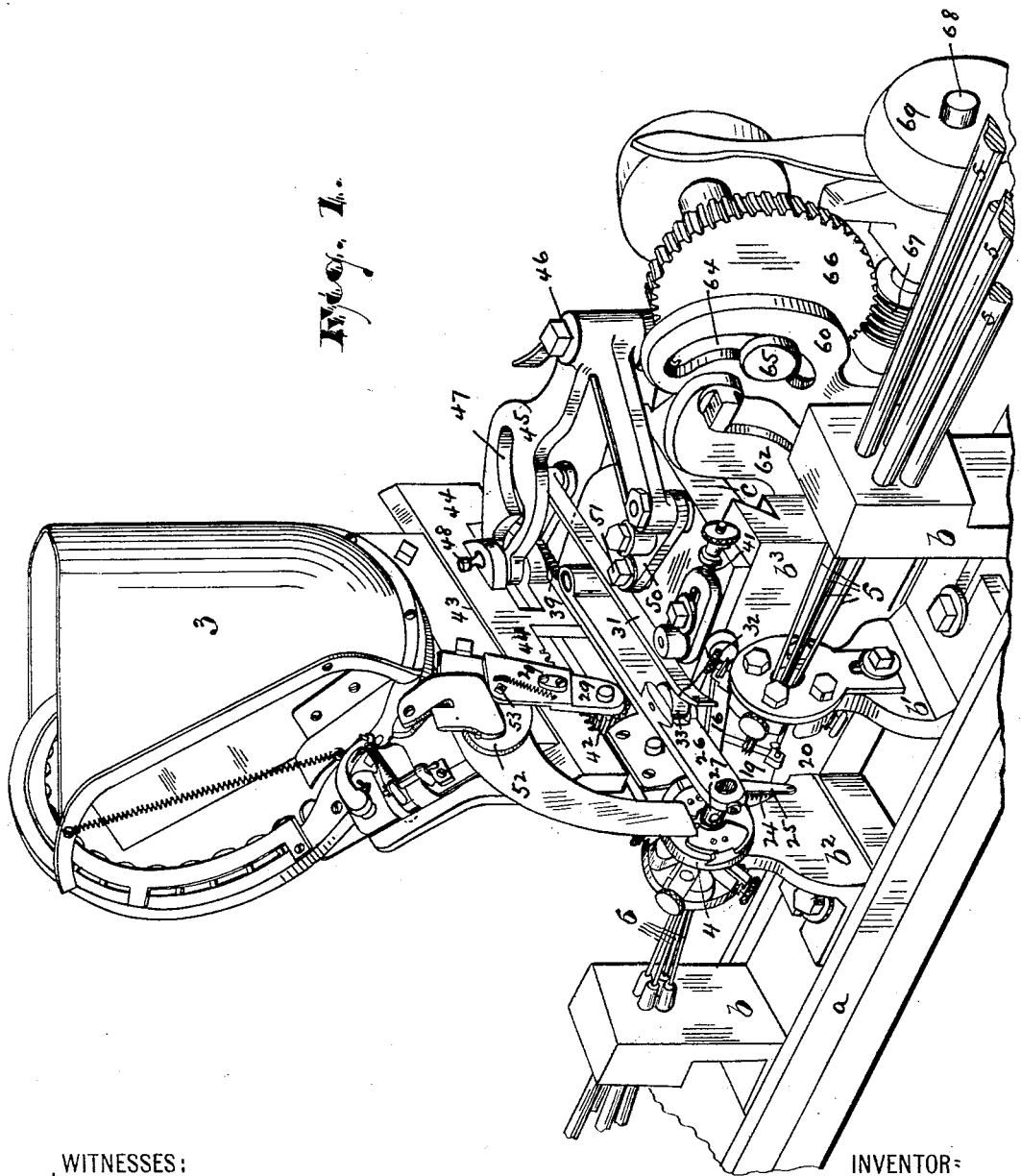

No. 704,356. Patented July 8, 1902.
T. F. MORRISSEY.
BUTTON MACHINE.
(Application filed Dec. 9, 1901.)
(No Model.) 6 Sheets—Sheet 1.

WITNESSES:
Henry Krug
Russell M. Everett

INVENTOR:
Thomas F. Morrissey,
BY
Drake
ATTORNEYS

No. 704,356.  
T. F. MORRISSEY.  
BUTTON MACHINE.  
(Application filed Dec. 9, 1901.)

(No Model.)

Patented July 8, 1902.

WITNESSES:  
Henry Krog  
Russell M. Everett

INVENTOR:  
Thomas F. Morrissey,  
BY  
Drake & Co.  
ATTORNEYS

No. 704,356. Patented July 8, 1902.
T. F. MORRISSEY.
BUTTON MACHINE.
(Application filed Dec. 9, 1901.)
(No Model.) 6 Sheets—Sheet 4.

WITNESSES: INVENTOR
Thomas F. Morrissey,
BY
ATTORNEYS.

No. 704,356. Patented July 8, 1902.
T. F. MORRISSEY.
BUTTON MACHINE.
(Application filed Dec. 9, 1901.)

(No Model.) 6 Sheets—Sheet 5.

WITNESSES:
Henry Krug
Russell M. Everett

INVENTOR:
Thomas F. Morrissey.
BY
Drake & Co.
ATTORNEYS.

No. 704,356. Patented July 8, 1902.
T. F. MORRISSEY.
BUTTON MACHINE.
(Application filed Dec. 9, 1901.)
(No Model.) 6 Sheets—Sheet 6.
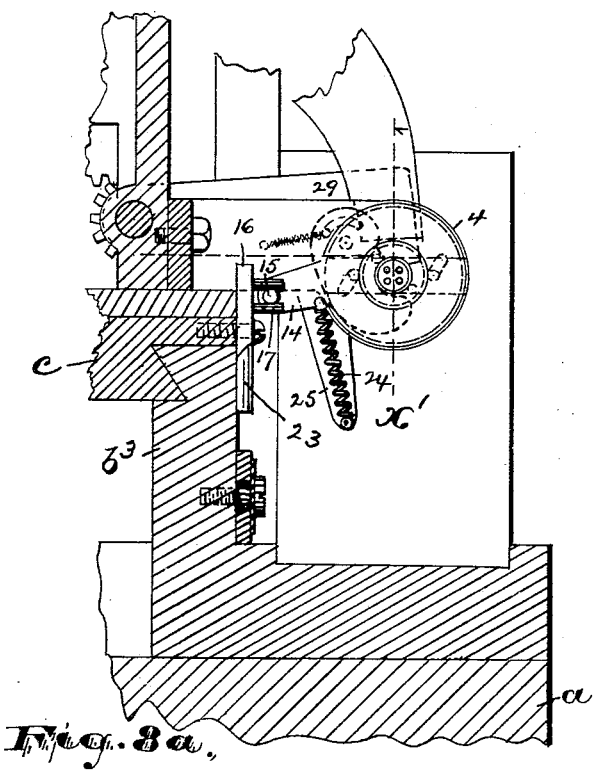
Fig. 8a.
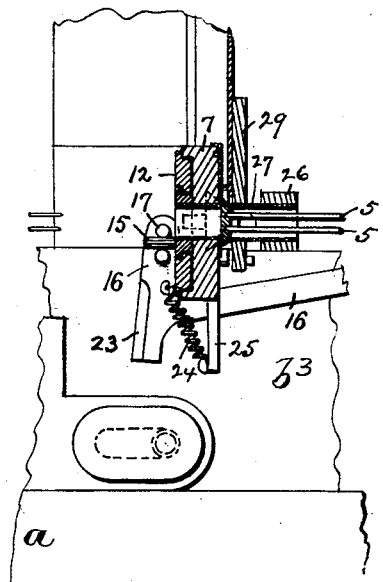
Fig. 9.
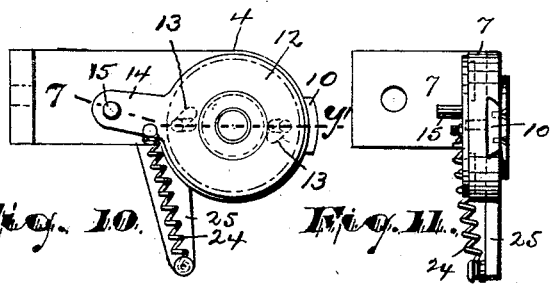
Fig. 10.    Fig. 11.    Fig. 12.
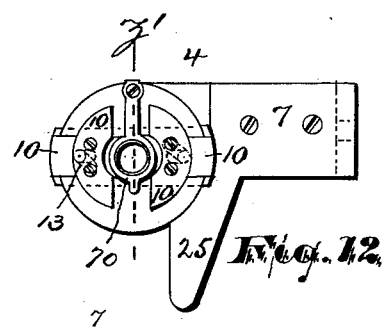
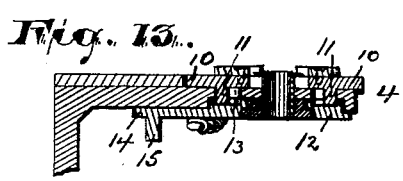
Fig. 13.    Fig. 14.
WITNESSES:
Henry Krug
Russell M. Everett
INVENTOR
Thomas F. Morrissey,
BY
Drake & Co.
ATTORNEYS.

UNITED STATES PATENT OFFICE.

THOMAS F. MORRISSEY, OF WEST ORANGE, NEW JERSEY, ASSIGNOR OF TWO-THIRDS TO JAMES M. SCHWARTZ AND DAVID D. SCHWARTZ, OF NEW YORK, N. Y.

BUTTON-MACHINE.

SPECIFICATION forming part of Letters Patent No. 704,356, dated July 8, 1902.

Application filed December 9, 1901. Serial No. 85,182. (No model.)

*To all whom it may concern:*

Be it known that I, THOMAS F. MORRISSEY, a citizen of the United States, residing at West Orange, in the county of Essex and State of New Jersey, have invented certain new and useful Improvements in Button-Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to certain improvements in that class of button-making machines represented by the machine shown in my prior patent, No. 547,561, dated October 8, 1895, the objects of the present improvements being to provide a more simple construction; to secure a machine which will be more durable and positive in its operations; to avoid the possibility of injury to the button during the drilling operations, such as the mashing of the button; to avoid the improper location of the hole in the button and to secure greater uniformity in such location; to secure a more uniform delivery of the button from its clutch after the drilling operation, and thus prevent an interference of the drilled button with the one next in order to be drilled and avoid injury to both buttons occasioned by such interferences, and to secure other advantages and results, some of which may be referred to hereinafter in connection with the description of the working parts.

The invention consists in the improved button-making machine, and in the feeding devices thereof, and in the devices for holding the button during the drilling operation and delivering the same after such drilling operation, and in the various other detail arrangements and combinations of parts of the same, all substantially as will be hereinafter set forth and finally embraced in the clauses of the claim.

Figure 4:
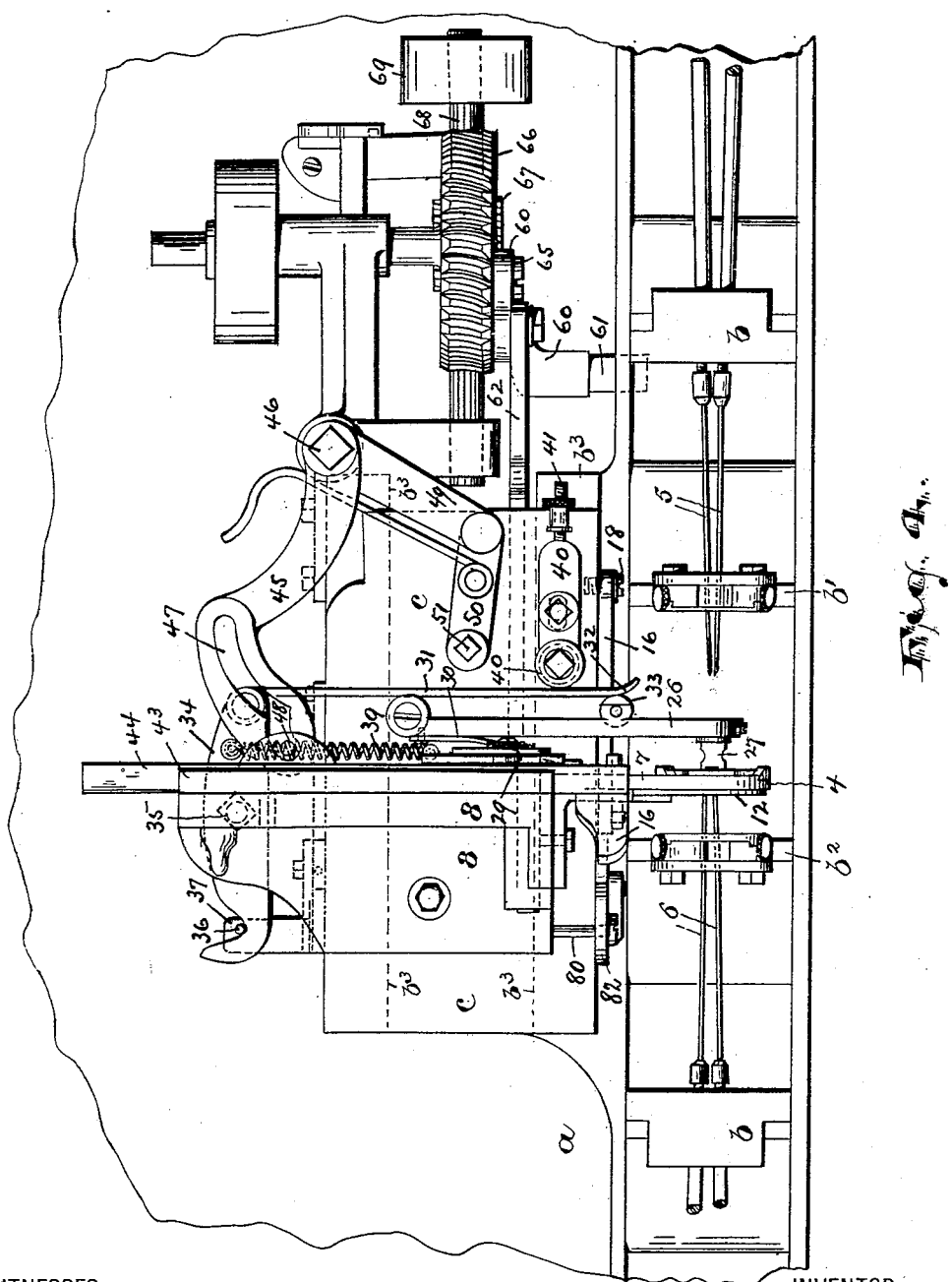
Figure 5:
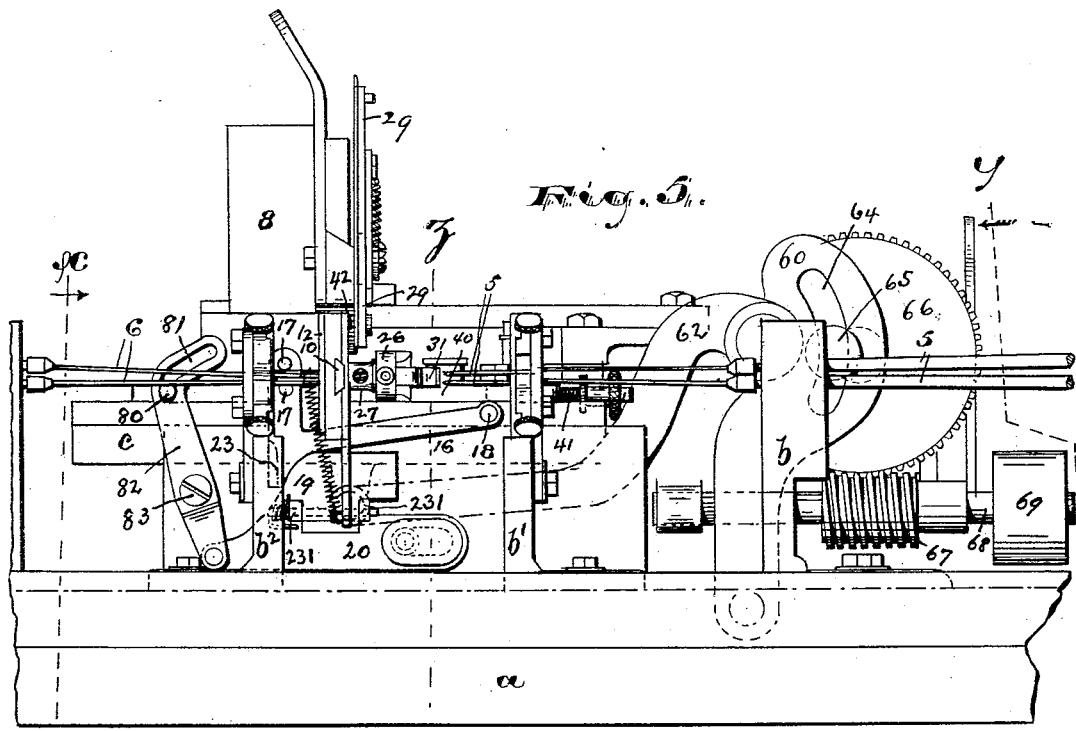
Figure 6:
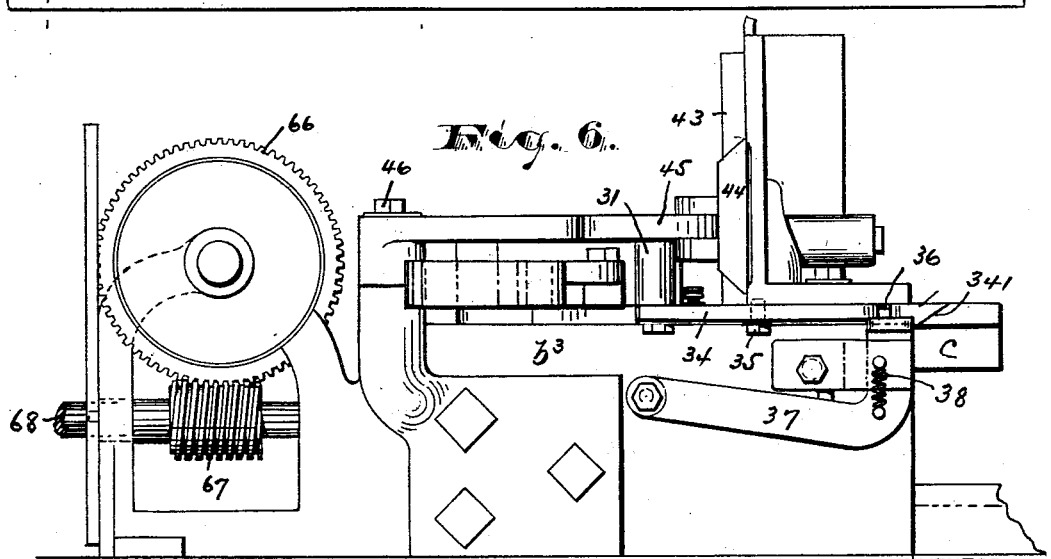
Figure 7:
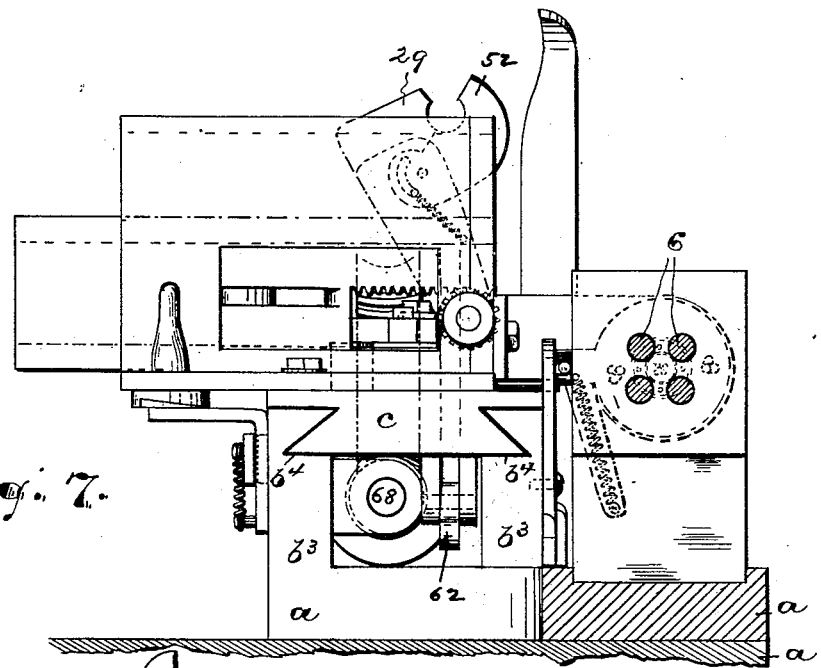
Figure 8:
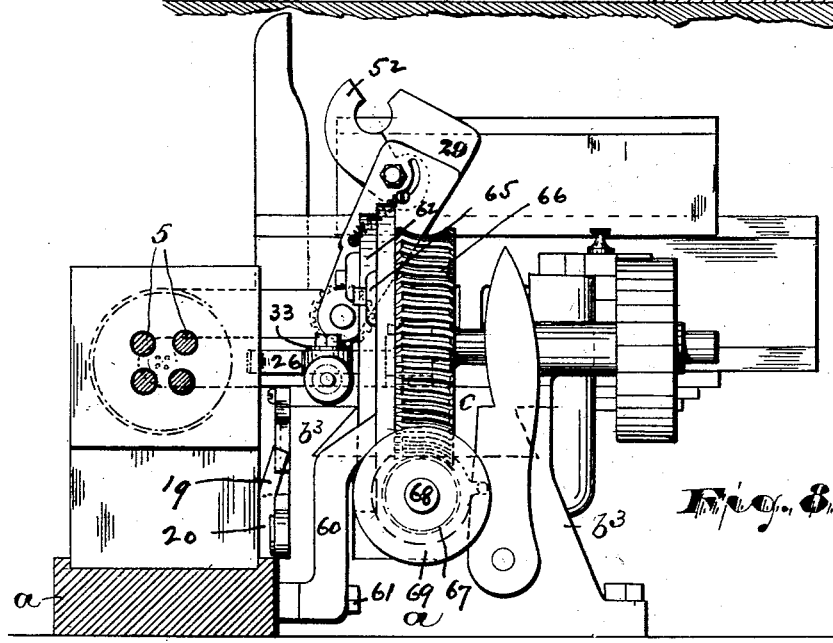

Referring to the accompanying drawings, in which like letters of reference indicate corresponding parts in each of the several figures, Figure 1 is a perspective view showing a general relation of the parts. Fig. 2 is a plan of the device, showing the parts while a button is being drilled, the receptacle for the blank buttons and certain of the feeding devices being removed to show certain reaming devices more clearly. Fig. 3 is a front view of the same. Fig. 4 is a plan showing the same parts of the machine when the button is being subjected to the reaming-drill. Fig. 5 is a front elevation of the same. Fig. 6 is a rear elevation of the same device. Fig. 7 is a section taken at line $x$ of Fig. 5, taken in the direction of the arrow. Fig. 8 is a section on line $y$ of Fig. 5, taken in the direction of the arrow. Fig. 8$^a$ is a section taken at line $z$ of Fig. 5. Fig. 9 is a section taken at line $x'$ of Fig. 8$^a$. Figs. 10, 11, and 12 are views of the button-holding chuck, Fig. 11 being a front view and Figs. 10 and 12 showing the opposite sides. Fig. 13 is a section at line $y'$ of Fig. 10, and Fig. 14 is a section at line $z'$ of Fig. 12.

In said drawings, $a$ indicates a bed-plate adapted to be seated on a table or bench or other fixture in any suitable manner and providing suitable bearings, seats, or standard $b$ $b'$ $b^2$, upon which the drills 5 and reaming-tools 6 have their bearings, said drills and reaming-tools being rotated in said bearings by pulleys arranged on said drilling and reaming tools in any suitable manner. At or toward the rear of the bed-plate the same is also provided with integral slideways $b^3$, which slideways at their tops are adapted to receive a reciprocating slide $c$, adapted to move in a path parallel with the axial line about which the collections of drills and reamers are grouped. Said slide $c$ supports the button-blank receptacle 3, the chuck or clutch 4, and the means for feeding the said button-blanks from said receptacle to the said chuck or clutch and for presenting the button first to the collection of drills and afterward to the collection of reamers. The movement of the slide $c$ on its slideways is substantially equal to the distance lying between the ends of the drills 5 and reamers 6, so that the said slide $c$ will first cause the clutch 4 to present the back of the button-blank to the said drill 5 and effect a boring out of the buttonholes in said blank and afterward present the said button at the front thereof to the reamers 6 and countersink the front of the button around the said holes. The frame or bed-bracket 7, supporting the said chuck or clutch 4, is rigidly secured upon the slide *c* or upon the casting 8 on said slide, which supports the button-blank receptacle 3. Said frame or bed-bracket 7 projects forward into the axial line of the groups of boring and reaming tools and is thereat provided with a central perforation to receive the boring and reaming tools, as hereinafter described. At one side said bracket 7 is provided at opposite sides of the said central perforation with button-gripping slides 10 10, Figs. 11, 12, and 13, concavously recessed at their adjacent ends, as shown in Fig. 12, to engage the peripheral edge of the button and hold the said button rigidly in place during the boring operations. At the opposite sides of the said central perforation for the boring-tool the said bracket 7 is furthermore perforated, as shown in Fig. 13, to receive lugs or pins 11, formed at the inner sides of said slides 10, the said lugs 11 projecting from said slides through the perforations or slots in the bracket into an annular recess formed on the opposite side of the bracket from that having the slideways for said slides. In said annular recess in the bracket is arranged an oscillating ring 12, having on its inner sides tangential slots 13, Figs. 10, 13, into which the said lugs or pins project, the said tangential slots 13 being formed parallel with one another, so that when the said ring 12 oscillates the said lugs 11 will be moved in opposite directions, either toward one another or from one another, and thereby give to the slides 10 10 opposite movements to or from the button-blank, whereby the said button-blank within the chuck will be clamped when the slides move toward one another and will be released when the said slides move in the opposite direction.

To reciprocate the ring 12 in the annular recess, I have provided the said ring at one side thereof with a radial arm 14, having at its extremity a stud 15, which is engaged by a lever 16, Figs. 8ª and 9, having a pair of studs 17, between which the stud 15 is arranged. The lever 16 is fulcrumed on the slide *c* at a distance from the chuck 4, as at 18 in Figs. 2, 3, and 5, and as the said slide moves backward and forward the said lever at its free end is caused to oscillate vertically to give the desired reciprocating movement to the chuck. The said lever 16 is so timed in its movements as to cause the reciprocating ring 12 and the button-clutching slides to hold the said slides closed against the button as the said button is making its movement first toward the drill and then back toward and into engagement with the reaming-tool, and immediately after the reaming operations are effected the said lever 16 is raised by suitable means hereinafter described and the said ring 12 is oscillated so that the button-clutching slides are moved apart or away from one another to release the button and permit the latter to drop from the chuck into a suitable receptacle beneath. The means employed for raising the said lever and operating the reciprocating slide-operating ring are of any suitable construction; but the one I prefer is shown more particularly in Figs. 2, 3, 4, 8, 9, in which I show arranged upon the bed of the machine an oscillating tripping-block 19, which is hinged pivotally upon the slide 20, having suitable bearings upon the bed at the front of one of the slideways $b^3$ and extends upward to engage the lever. At one end of the tripping-block 19 the same is provided with a rounded or inclined surface 21, adapted to engage a similarly-inclined surface 22, Fig. 3, of the lever, the parts being so formed and arranged that the said lever when the said inclined surfaces are brought into contact will be raised to effect a turning of the ring and an opening of the button-clutching slides. After the raising of the lever 16, as described, the said lever, traveling with the slide *c*, passes over the said tripping-block and after disengaging from said block and dropping by gravity or spring action effects a movement of the button clutch or clutches such that the button between the button-gripping slides 10 will be released. After the first boring operation and during the return movement of the chuck toward the counterboring-tools 6 the said lever 16, moving with the slide *c*, enters between the bed-plate and tripping-block 19, the said lever being at its forward end beveled, as at 23, to force the said block outward on its hinges 231, and thus the chuck, moving backward and forward with the slide *c* and lever 16, is alternately opened and closed, the opening of the chuck being of a duration sufficient to permit the outpassage of the bored and counterbored button and the inpassage of a blank button to be bored.

To close the chuck for holding the button, I prefer to employ a spring 24, which is preferably attached at one end to the bottom of the ring-arm 14 and at the opposite end to a suitable arm 25, attached to the frame or bed 7 of the chuck.

The button-blank is forced to a central position between the slides of the chuck after having been fed to the chuck by means of a button-setting arm 26, pivoted upon and movable with the slide *c*, the free end of the said button-setting arm 26 being perforated to permit the passage of the group of drills to the button and at the perforation being provided with a hollow finger 27, adapted to press against the button as it lies in the button-feed arm 29, hereinafter referred to, and thrust it therefrom into the chuck. A spring 30, Fig. 4, serves to throw the free end of the arm away from the chuck, and a longitudinally-movable keeper-arm 31, provided at its extremity with a wedge-like or inclined surface 32, serves to hold the said button-setting arm 26 toward the chuck during the boring operation.

The keeper-arm 31 is adapted to be withdrawn from holding relation with the button-setting arm, so as to permit the said setting-arm to move under the power of the spring 30 away from the chuck, and to reduce friction of the parts I provide the button-setting arm 26 with an antifriction-roller 33, which is adapted to ride upon the inclined surface of the keeper-arm 31. The keeper-arm 31 is pivoted upon a trip-lever 34, fulcrumed at 35 and adapted to engage a stud or pin 36 upon a lever 37, arranged upon the bed-frame, the trip-lever 34 being so constructed and arranged as to cause the sliding keeper-arm 31 to hold the button-setting lever 26 in place during the comparatively long period of time during which the button travels back and forth, first toward the drills 5 and afterward toward the countersinking-drills 6, and then, after the countersinking operation has been effected, to quickly cause the keeper-arm 31 to withdraw and permit the stay-arm 26 to move away from the button or chuck, so that the bored or countersunk button will be released and the button-feed arm 29 will be permitted to place a blank button in position in front of the chuck in its place. The lever 37 for the tripping-stud 36 is free to turn on the bed-plate so that the trip-lever 34 will pass over the top end of said stud when moving in one direction, and in the opposite direction the said trip-lever will be turned on its fulcrum by said stud, said lever 34 being beveled, as at 341, Fig. 6, on the under side and adapted to depress the stud and its bracket to permit its passage thereover. The lever 37 is held in normal position by a spring 38. A spring 39 serves to throw the keeper-arm and with it the button-setting lever-arm to the position for holding the button. When the said lever 34 is disengaged from the stud 36, the said keeper-arm 31 bears against an adjustable bearing 40 upon the slide c, said bearing being adjusted on the said slide c by means of an adjusting-screw 41 or other suitable means.

The button-feed arm 29, above referred to, comprises an oscillating body carried upon a pinion 42, having bearings on an extension of the slide c at a distance from the chuck, said arm 29 at its free end having a movement back and forth from the chuck to the button-blank receptacle 3. To operate the said feed-arm 29, I have provided on the slide c a transverse slideway 43 for a rack 44, said rack being operated by a cam-lever 45, fulcrumed at 46 upon the bed-plate a and having in one arm thereof an irregular cam-groove 47, adapted to receive a pin 48 on the rack 44, and the other arm 49 of the lever 45 being connected by a link 50 to a pivotal bearing 51 on the slide c. Thus when the slide c is caused to reciprocate the said cam-lever 45 is caused to oscillate on its fulcrum 46 to effect the desired back-and-forth movement of the transverse slide. The slide c is given a back-and-forth movement on the bed-plate by means of an oscillating cam-lever 60, pivoted or fulcrumed at 61 and having pivotally connected to the free end thereof an arm or link 62, said arm being pivotally attached to the slide and at its projecting extremity pivoted upon said oscillating lever. The said cam-lever 60 is provided with a curved cam-slot 64, adapted to receive an eccentric-pin 65 of a worm-wheel 66, and the said worm-wheel in turn is operated by a coöperating worm-wheel 67, arranged upon the driving-shaft 68, the last being in turn operated by the belt-pulley 69. The said parts thus last described are so arranged as that the continuous rotation of the worm-wheel 66 causes the lever 60 to oscillate back and forth and with it the plate c, and from said slide c the clutching and feeding devices receive their movements, already described. The parts thus described are so arranged and timed as to cause the oscillating feed-arm 29 to receive the button from the feeding mechanism— such, for instance, as I have described in my Patent No. 634,306, of October 3, 1899—and present the blank to the chuck when the setting-arm 26 is withdrawn from the said chuck after the bored button has dropped out of the said chuck. At the free end of the feed-arm 29 the same is provided with a finger 52, which with the body of said arm forms a receptacle for the button adapted to hold said button while it is being conveyed to the chuck. After the said button-blank has been presented to the chuck and the button-setting arm has pressed the button from the receptacle in said feed-arm into said chuck the said feed-arm is adapted to be returned to receive a new button-blank, and to permit such action the finger 52 is adapted to open or turn on its pivot 53 by engagement at its free end with the hollow finger 27 of the setting-arm, the said finger being adapted to close immediately by spring action after the said feed-arm is disengaged from the said hollow portion. The feed-arm after having delivered the button-blank to the chuck remains in its position of delivery during the drilling operation, but when the chuck is withdrawn from the drills the feed-arm rises away from the chuck and during the counterboring operation receives a new blank and presents it to the chuck as soon as the counterbored button drops out by gravity or is forced out by a spring 70, Figs. 12 and 14, the slides 10 being then released or drawn away from the button to permit the spring 70 to act.

The cam-slot in which the crank or eccentric pin 65 is arranged is so disposed in relation to said pin as to effect a slow movement of the slide and the chuck 4 when the button is being presented to the drills for boring the holes in the button, and after such boring to effect a quick movement of said slide and chuck to the reaming-tools. After the reaming said chuck, because of the shape of the cam-slot and its relation to the eccentric-pin, moves again toward the drilling-tools at a rapid rate of speed. By this arrangement and operation the drills have ample time to effect a proper drilling, and yet the movements before and after the drilling are quick to increase the capacity of the machine.

On the slide $c$ is formed a pin or projection 80, which projects into the slot 81 of a chuck-opening lever 82, fulcrumed on the bed-plate, as at 83, the slot being curved at one end and straight at the other to lie parallel with the line of movement of the pin 80, as shown in Fig. 3, so that the slide 20 will be temporarily at rest and only be moved to quicken the engagement of the bearings 21 22 when it is necessary to open the chuck.

Having thus described the invention, what I claim as new is—

1. In a button-machine, the combination with the drilling and counterboring tools and means for operating the same, of a carriage or slide movable reciprocally in a direction approximately parallel with said drilling and counterboring tool and supporting means for feeding the buttons to the tools, and means for reciprocating said slide or carriage, comprising a wheel having an eccentric-pin, and means for rotating said wheel, a lever having a cam-slot and an arm or link connecting said lever and slide, the latter being irregularly moved thereby.

2. In a button-machine, the combination with the bed-plate having a slideway, and drilling and counterboring tools and means for operating said tools, of a carriage or slide adapted to move reciprocally on said slideway and supporting a button-receptacle and means for feeding the buttons to said tools, and means for reciprocating said slide comprising a worm-wheel and means for rotating the same, a slotted lever fulcrumed on the bed-plate and an arm or link connecting said lever and slide, substantially as set forth.

3. In a button-machine, the combination with the bed-plate having a slideway, drilling and counterboring tools and means for operating said tools, of a slide or carriage arranged on said slideway and carrying a button-receptacle and means for transferring the buttons from the said receptacle to a point in line with the drilling and counterboring tools, said slide having an arm or link projecting therefrom, a cam-lever, fulcrumed on the bed-plate and near its free end pivotally connected to said arm, and having a cam-slot, a worm-wheel having an eccentric-pin working within said cam-slot, a coöperating worm-wheel arranged on a shaft and a pulley on said shaft with the said coöperating worm-wheel, substantially as set forth.

4. In a button-machine, the combination with the bed-plate having a slideway and drilling-tool and counterboring-tools, a slide or carriage arranged in said slideway, and having button-clutching means, means for reciprocally moving said slide or carriage, a transverse slide arranged on the first said slide or carriage and having rack-teeth, means for reciprocating the last said slide, an oscillating button-feed having a pinion meshing with said rack-teeth, a button-setting arm adapted to push the button from the button-feed into the chuck while the latter is distant from the drilling and counterboring tools, means for operating said button-setting arm, counterboring and drilling tools between which the chuck is movable, a cam-lever having a curved slot, a wheel having an eccentric-pin working in said curved slot, means for rotating said wheel and means for transferring movement from the cam-lever to the slide or carriage having the chuck, substantially as set forth.

5. In a button-machine, the combination with the drilling and counterboring tools and means for operating the same of a chuck moving back and forth between said tools, and means for thus moving said chuck, said chuck being open to receive the button and said chuck being provided with clutching-slides, means for operating said parts, a setting-arm 26, having a hollow finger, a spring for releasing said setting-arm from the chuck and means for operating the setting-arm to effect a thrust of the button from the button-feed arm into the chuck a button-feed arm and means for operating the same, all substantially as set forth.

6. In a button-machine, the button-chuck herein described, comprising a bracket having a central perforation with slots at opposite sides thereof, slides having pins extending through said slots, a ring arranged at the opposite side of said bracket from said slides and having tangential grooves, and means for turning said ring on said bracket and effecting a clutching or releasing movement of the slides, substantially as set forth.

7. In a button-machine, the button clutch or chuck comprising a perforated bracket having means for clutching the button, and a ring adapted to be oscillated on said clutch to effect an opening or closing of the button-clutching means, said ring having an arm having a pin 15, a lever 16, engaging the pin 15, to oscillate the ring, and means for reciprocating said lever, substantially as set forth.

8. In a button-machine, the button-clutching means comprising a slide $c$, carrying a bracket, means for operating said slide $c$, a bracket having slides 10, means for holding the button between said bracket-slides 10, a ring adapted to operate said slides to release or grasp the button, said ring having an arm 14, and pin 15, a spring for turning the ring in one direction on the bracket and a train of mechanism operated by the slide $c$, for turning the ring in the opposite direction, substantially as set forth.

9. In a button-machine, the button-clutching means comprising a slide $c$, carrying a clutch or chuck, bracket, means for operating said slide $c$, slides 10, on said bracket, means for holding the button between said bracket-slides 10, a ring adapted to move said slides oppositely and a train of mechanism actuated by the slide $c$, and transmitting movement to said slides 10, substantially as set forth.

10. The combination with the slide $c$, and chuck carried thereby and adapted to be opened to release the button, of the lever 16, fulcrumed on said slide $c$, and adapted to travel therewith, of the block 19, adapted to enter into engagement with said lever to turn the same and effect an opening of the chuck, substantially as set forth.

11. The combination with the slide $c$, and chuck carried by said slide and adapted to be opened to release the button, of the lever 16, adapted to open the chuck and a hinged block adapted to raise said lever as said lever travels with said slide $c$, to effect an opening of the chuck, substantially as set forth.

12. The combination with the slide $c$, and chuck, carried by said slide and adapted to be opened to release the button, of the lever 16, fulcrumed on said slide and connected to the chuck, a slide 20, carrying a hinged block and a lever 82, operating the slide 20, and acted upon by the slide $c$, substantially as set forth.

13. The combination with the slide $c$, having a pin 80, and a chuck carried thereby, of the lever 16, fulcrumed on said slide and connected to the chuck, a slide 20, carrying a hinged block adapted to raise the said lever, a slotted lever adapted to operate the slide 20, and adapted to be operated by the pin 80, to hasten the engagement of the block and lever 16, substantially as set forth.

In testimony that I claim the foregoing I have hereunto set my hand this 14th day of August, 1901.

THOS. F. MORRISSEY.

Witnesses:
CHARLES H. PELL,
C. B. PITNEY.